US 6,622,239 B1

(12) United States Patent
Wong et al.

(10) Patent No.: US 6,622,239 B1
(45) Date of Patent: Sep. 16, 2003

(54) METHOD, SYSTEM AND COMPUTER PROGRAM PRODUCT FOR OPTIMIZATION OF SINGLE BYTE CHARACTER PROCESSING EMPLOYED WITHIN A MULTIBYTE CHARACTER ENCODING SCHEME

(75) Inventors: Wai Yee Peter Wong, Austin, TX (US); Bruce Lee Worthington, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,883

(22) Filed: Jun. 25, 1999

(51) Int. Cl.[7] .................. G06F 9/455; G06F 17/21; G06T 11/60
(52) U.S. Cl. .............. 712/227; 712/300; 715/535; 715/531; 715/529; 345/467
(58) Field of Search ................. 712/223, 225, 712/300, 209, 227; 711/216, 206; 710/65, 67, 68; 345/467.551, 171, 471; 707/542; 704/8; 715/535, 531, 529

(56) References Cited

U.S. PATENT DOCUMENTS 5,870,084 A * 2/1999 Kanungo et al. ............ 345/551
6,323,864 B1 * 11/2001 Kaul et al. .................. 345/467

* cited by examiner

Primary Examiner—Daniel H. Pan
(74) Attorney, Agent, or Firm—Leslie A. Van Leeuwen; Bracewell & Patterson, L.L.P.

(57) ABSTRACT

A method, system and computer program product for optimizing processing of single byte characters employed within a multibyte character encoding scheme in association with an underlying data encoding scheme employed within an operating system. The method includes: (1) receiving a data string, (2) passing the data string in its entirety to a first processing routine and (3) evaluating the data string to determine if any character in the data string is an excluded character of a host font. The method further includes (4) transferring the data string in its entirety to a second processing routine and (5) assessing a limited number of characters in the data string to determine if the data string can be converted under an underlying encoding scheme.

19 Claims, 6 Drawing Sheets

METHOD, SYSTEM AND COMPUTER PROGRAM PRODUCT FOR OPTIMIZATION OF SINGLE BYTE CHARACTER PROCESSING EMPLOYED WITHIN A MULTIBYTE CHARACTER ENCODING SCHEME

BACKGROUND OF THE INVENTION

1. Technical Field

The present invention relates in general to data processing and more specifically, to a method, system and computer program product for optimization of single byte character processing employed within a multibyte character encoding scheme.

2. Description of the Related Art

Before computers, language was spoken and then written as shapes on paper. An individual recognizes these shapes and is able to reproduce the sounds and hence the meaning of the message. With the advent of computers, it was necessary to represent characters as codes inside the computer's memory so that text could be stored and reproduced. Early computers structured their memory into chunks (now commonly known as "bytes") and each of these chunks was used to represent a character. However, different computers used different character encoding schemes, making it difficult to exchange information between computers.

A standard was established by the computer industry for the length of a byte to be eight bits. The eight-bits byte allowed for 256 different characters to be encoded, sufficient to handle upper case English and even to extend to lower case as well. This became known as American Standard Code for Information Interchange (ASCII).

With the spread of computers worldwide, it has become a requirement that computers, when handling text, are able to recognize and manipulate text in different languages. However, most computers are utilized in one language, resulting in a different character set for each of the languages. This works well for single language machine use. However, when information is shared or sent from machines employing disparate languages, a problem arises in that the same code point, i.e., character encoding, may represent different characters in different character sets.

To resolve the problem of having the same code point representing different characters in different character sets, multibyte character encoding schemes, such as "Unicode" and "Multicode," were established. For example, Unicode uses a sixteen bit character encoding system designed to support text written in diverse human languages. The multibyte character encoding schemes are designed to allow computer systems to exchange text information unambiguously because each code point represents a unique character.

Presently, however, it is not common to have font sets that are capable of displaying all the possible characters in a multibyte character encoding scheme. Typically, most fonts for western languages, such as English, will display only the first 256 out of a total of 65535 Unicode characters. Thus, if an application program desires to use characters from multiple languages in one sentence, or intends to display a data string that contains, e.g., English text with mathematical symbols, a single font, such as Times Roman, cannot display all the characters. To overcome this limitation, Sun Microsystems, Inc. has introduced the concept of multiple host fonts into their Java virtual machines (JVMs). To illustrate how the concept of multiple host fonts is implemented, consider the following excerpted portion of a font property file:

dialog.0=Arial,ANSI_CHARSET
dialog.1=WingDings,SYMBOL_CHARSET,NEED_CONVERTED
dialog.3=Symbol,SYMBOL_CHARSET,NEED_CONVERTED
Exclusion Range info,
exclusion.dialog.0=0100-20ab,20ad-ffff Within the font property file, Java Font Dialog is mapped into a series of host fonts, namely Arial, WingDings and Symbol (in the above illustration). For characters that cannot be handled by a particular font, e.g., mathematical symbols using Arial, exclusion ranges of that particular font are specified. For example, in the above illustration, the exclusion ranges for Arial are 0x100–0x20ab and 0x20ad–0xfff, while no exclusion ranges for the fonts WingDings and Symbol are specified. Additionally, each font is associated with a converter that is used to map each, e.g., Unicode, character into bytes understood by the underlying encoding scheme. The general scheme is that if an Unicode character cannot be handled, i.e., not supported, by the first host font, the second host font specified is tried and so on. The goal is to try to support as much of the multibyte character set as desired.

However, the introduction of multiple host fonts causes a significant performance degradation, in particular when drawing text strings. In this case, for every character in the string, two checks must be performed. Firstly, it must be determined if the character is an excluded character for the specified font. Secondly, if it is not an excluded character, can this specific character be mapped into an underlying encoding scheme, such as ISO Latin-1. These multiple checks, however, have become an expensive part, in terms of time required, of text drawing.

SUMMARY OF THE INVENTION

It is an object of the present invention to provide a method, system and computer program product for optimizing processing of single byte characters within a multibyte character encoding scheme.

To achieve the foregoing object, and in accordance with the invention as embodied and broadly described herein, a method, system and computer program product for optimization of single byte character processing within a multibyte character encoding scheme is disclosed. The method includes: (1) receiving a data string, (2) passing the data string in its entirety to a first processing routine and (3) thereafter evaluating the data string to determine if any character in the data string is an excluded character of a host font. The method further includes (4) transferring the data string in its entirety to a second processing routine and (5) assessing a limited number of characters in the data string to determine if the data string can be converted under an underlying encoding scheme.

The present invention recognizes that in a multiple font environment, the conventional method of examining each individual character in a data string to determine if the character is an excluded character for a given font, followed by determining if the character can be mapped, i.e., converted, into the underlying encoding scheme are usually unnecessary for data strings that only contain ASCII characters. Typically, only the first host font is required, i.e., in most cases, ASCII characters are not excluded characters and those characters can be mapped into the underlying encoding scheme. The present invention therefore introduces the broad concept of examining the attributes of the data string as a whole, or a limited number of characters within the data string, within one function call, as opposed to examining each character separately with multiple function calls. This approach will facilitate efficient processing of data strings, employing multibyte character encoding, that only contain single byte ASCII characters within a multiple host font environment.

In one embodiment of the present invention, the step of receiving a data string further includes inputting the data string from a data entry device. It should be readily apparent to those skilled in the art that any device that is capable of inputting data, such as a computer keyboard, is well within the intended scope of the present invention.

In another embodiment of the present invention, the step of passing further comprises transmitting the data string to the first processing routine as an array. It should be well understood by those skilled in the art that arrays encompass data representation, such as a table or matrix structure.

In yet another embodiment of the present invention, the step of transferring further comprises transmitting the data string to the second processing routine as an array. As discussed above, it should be well understood by those skilled in the art that arrays encompass data representation, such as table structures.

In another embodiment of the present invention the step of evaluating further includes combining all characters in the data string using boolean operation OR to form a single character, determining if the resulting single character is a single byte character and checking the host font's exclusion ranges to determine if the exclusion ranges contain a single byte character.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
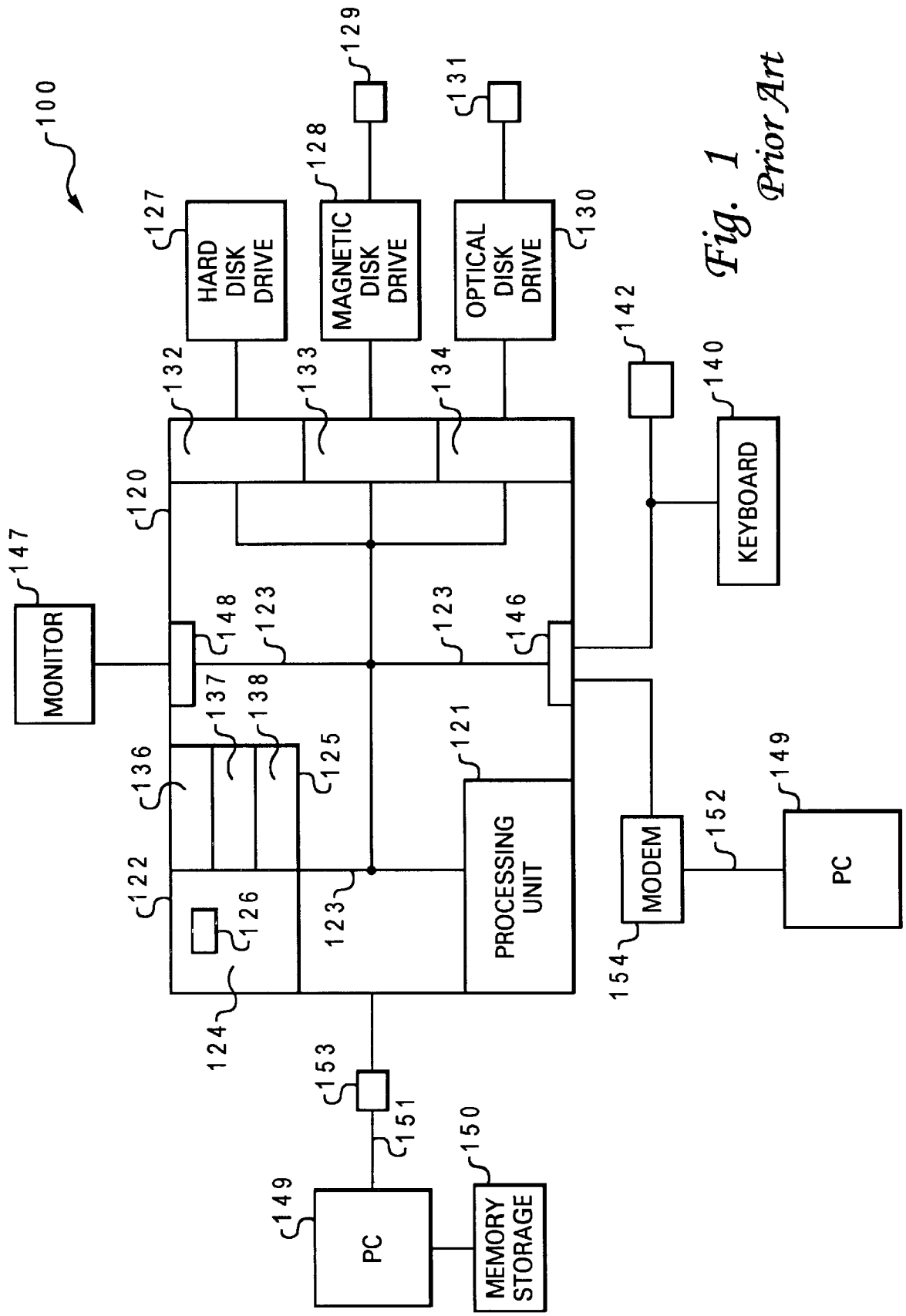
FIG. 1 illustrates an exemplary embodiment of a computer system that provides a suitable environment for the practice of the present invention.

With reference now to the figures, and in particular, with reference to FIG. 1, there is illustrated an exemplary embodiment of a computer system 100 that provides a suitable environment for the practice of the present invention. Computer system 100 includes a conventional personal computer (PC) 120 that includes a processing unit 121, a system memory 122 and a system bus 123 that couples system memory 122 to processing unit 121. In the illustrated embodiment, system memory 122 includes read only memory (ROM) 124 and random access memory (RAM) 125. A basic input/output device (BIOS) 126 containing the basic routines that help transfer information between elements within personal computer 120, such as during start-up, is generally stored in ROM 124.

Personal computer further includes a hard disk drive 127, a magnetic disk drive 128, e.g., to read from and write to a removable disk 129, and an optical disk drive 130, e.g., for reading a CD-ROM disk 131 or to read from or write to other optical media. Hard disk drive 127, magnetic disk drive 128 and optical disk drive 130 are connected to system bus 123 by a hard disk drive interface 132, a magnetic disk drive interface 133 and an optical drive interface 134, respectively.

The drives and their associated computer-readable media provide nonvolatile storage for personal computer 120. It should be noted that although the description of computer-readable media discussed above refers to a hard disk, a removable magnetic disk and a CD-ROM disk, it should be readily apparent to those skilled in the art that other types of media that are readable by a computer, e.g., magnetic cassettes, flash memory cards and the like, may also be employed in the exemplary operating environment.

A number of program modules may be stored in the drives and RAM 125, including an operating system, one or more application programs 136, other program modules 137 and program data 138. A user may enter commands and information into personal computer 120 through a keyboard 140 and pointing device 142, e.g., a mouse. Other data input devices may include a microphone, joystick, game pad, satellite dish, scanner, or the like. Data input devices are commonly connected to processing unit 121 through a serial port interface 146 that is coupled to system bus 123, but may be connected utilizing other types of interfaces, such as a game port or a universal serial bus (USB). A monitor 147 or other type of display device is also connected to system bus 123 via an interface, such as a video adapter 148.

Personal computer 120 may be operated in a networked environment using logical connections to one or more remote computers, such as remote computer 149. Remote computer 149 may be a server, router, peer device or other common network node and typically includes all or all of the elements described relative to personal computer 120, even though only a memory storage device 150 is illustrated. The logical connections depicted in FIG. 1 include a local area network (LAN) 151 and a wide area network (WAN) 152.

When employed in a LAN networking environment, personal computer 120 is connected to LAN 151 through a network interface 153. When utilized in a WAN networking environment, personal computer 120 generally includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device. It should be readily apparent that the network connections illustrated are exemplary and that other means of establishing a communication link between computers may also be advantageously employed.

It should be noted that the foregoing discussion is intended to provide a brief, general description of an exemplary computing environment in which the present invention may be advantageously practiced. While the illustrated exemplary environment is described within the general context of a distributed computing environment, those skilled in the art should recognize that the present invention may also be implemented in other environments. In a distributed computing environment, tasks are performed by remote processing devices that are linked through a communication network. Program modules may be located in both local and remote memory storage devices. Program modules, e.g., routines, programs, components and data structures, perform particular tasks or implement particular abstract data types. The present invention may also be practiced in the context of an application program that runs on an operating system, in conjunction with a personal computer or in combination with other program modules. Furthermore, those skilled in the art should readily appreciate that the present invention may be practiced with other computer systems configurations, including hand-held devices, multiprocessor systems, minicomputers and mainframe computers.

Figure 2:
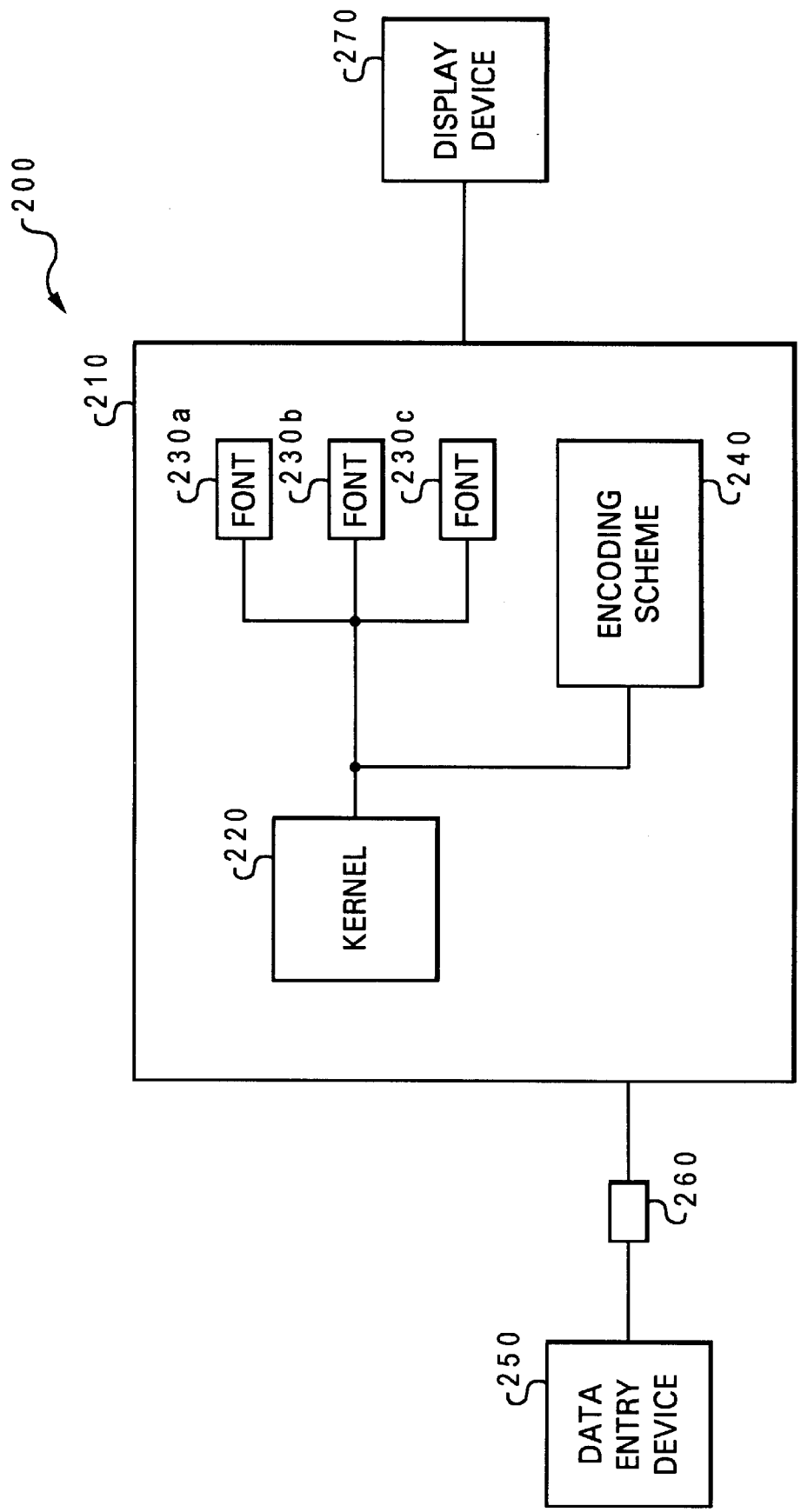
FIG. 2 illustrates a high-level block diagram of an embodiment of a data display processing system employing the principles of the present invention.

Referring now to FIG. 2, there is illustrated a high-level block diagram of an embodiment of a data display processing system 200 employing the principles of the present invention. Processing system 200 includes an operating system 210 that includes a kernel 220 that is coupled to a plurality of host fonts 230a, 230b, 230c, such as Times Roman, Arial and Courier, respectively, and an underlying data encoding scheme 240, such as ISO Latin-1. Generally, operating system 210 receives a data string 260, which typically consists of a plurality of characters, from a data entry device 250, such as a keyboard, to be displayed on a display device 270, such as a monitor. It should be noted that data string 260 need not necessarily originate from data entry device 250, but in other advantageous embodiments, may originate from the Internet or from an application program. The characters in data string 260 are encoded, i.e., represented, using a multibyte character encoding scheme, such as Unicode or Multicode. In an advantageous embodiment, an individual character in data string 260 is represented by sixteen bits.

Currently, as discussed previously, two checks must be performed for each character in data string 260. Initially, it must be determined if the character is an excluded character for the specified host font. If it is determined that the character is not an excluded character for the specified host font, it is followed by another determination to see if this character can be mapped into underlying encoding scheme 240. These checks are a significant part of the time "overhead" for drawing text strings. The present invention recognizes that in a multiple font environment, the conventional method of examining each individual character in a data string to determine if the character is an excluded character for a given font, followed by determining if the character can be mapped, i.e., converted, into the underlying encoding scheme are unnecessary for data strings that only contain ASCII characters. Typically, only the first host font is required, i.e., in most cases, ASCII characters are not excluded characters and they can be mapped into the underlying encoding scheme.

Figure 3:
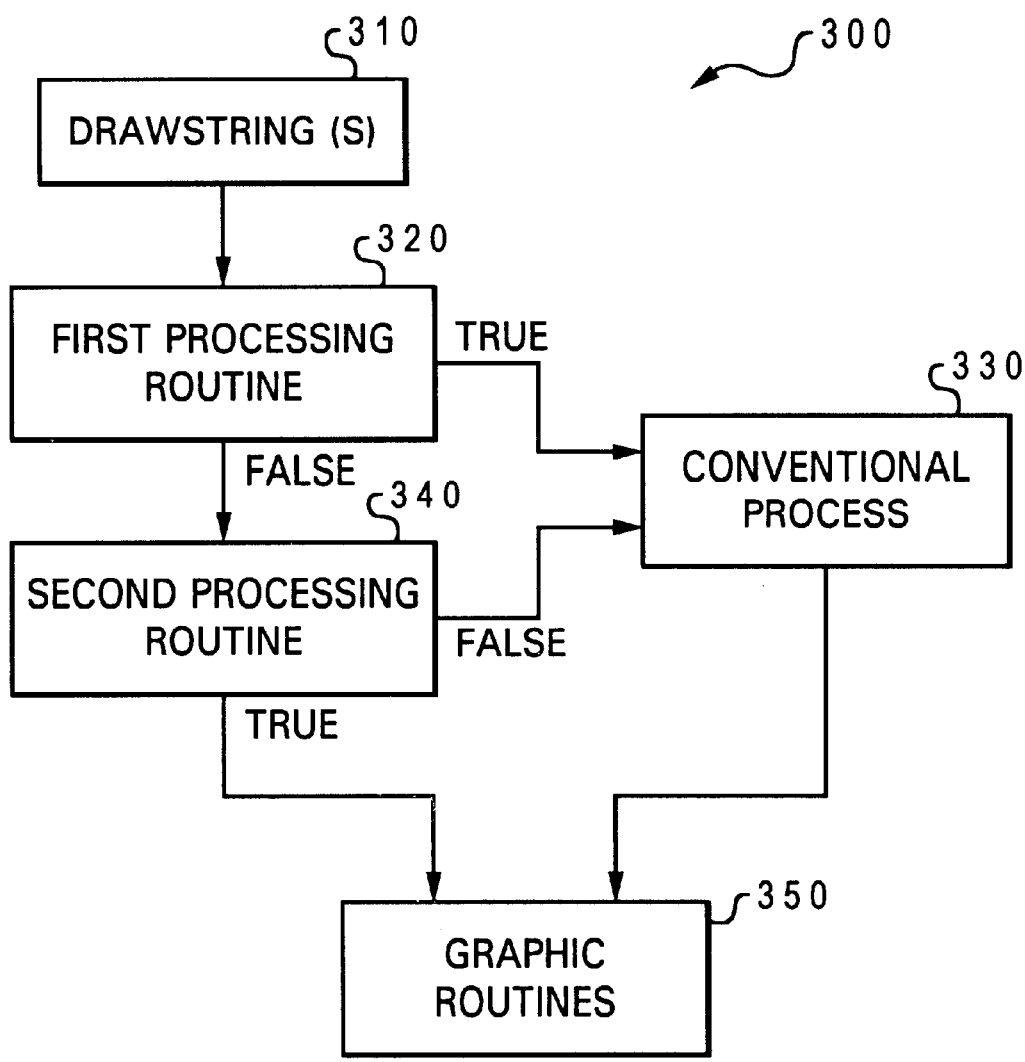
FIG. 3 illustrates a high-level process flow diagram of an embodiment of a method to optimize processing of single byte characters according to the principles of the present invention.

With reference now to FIG. 3, there is illustrated a high-level process flow diagram 300 of an embodiment of a method to optimize processing of single byte characters according to the principles of the present invention. The method begins at a begin step 310 wherein receipt of a request to display a data string s, analogous to the data string 260 illustrated in FIG. 2, is illustrated. Upon receipt of the display request, the entire data string s is passed, in its entirety, to a first processing routine 320 to determine if there is any character within data string s that is an excluded character for a specified host font. In an advantageous embodiment, data string s is transmitted to first processing routine 320 as an array, e.g., a table of characters. Two embodiments of first processing routine 320 will be described with respect to FIGS. 4 and 5, with continuing reference to FIG. 3. Those skilled in the art should understand, however, that the foregoing embodiments and the system of the present invention, in general, may also be implemented in hardware, firmware, software, or any combination thereof.

Figure 4:
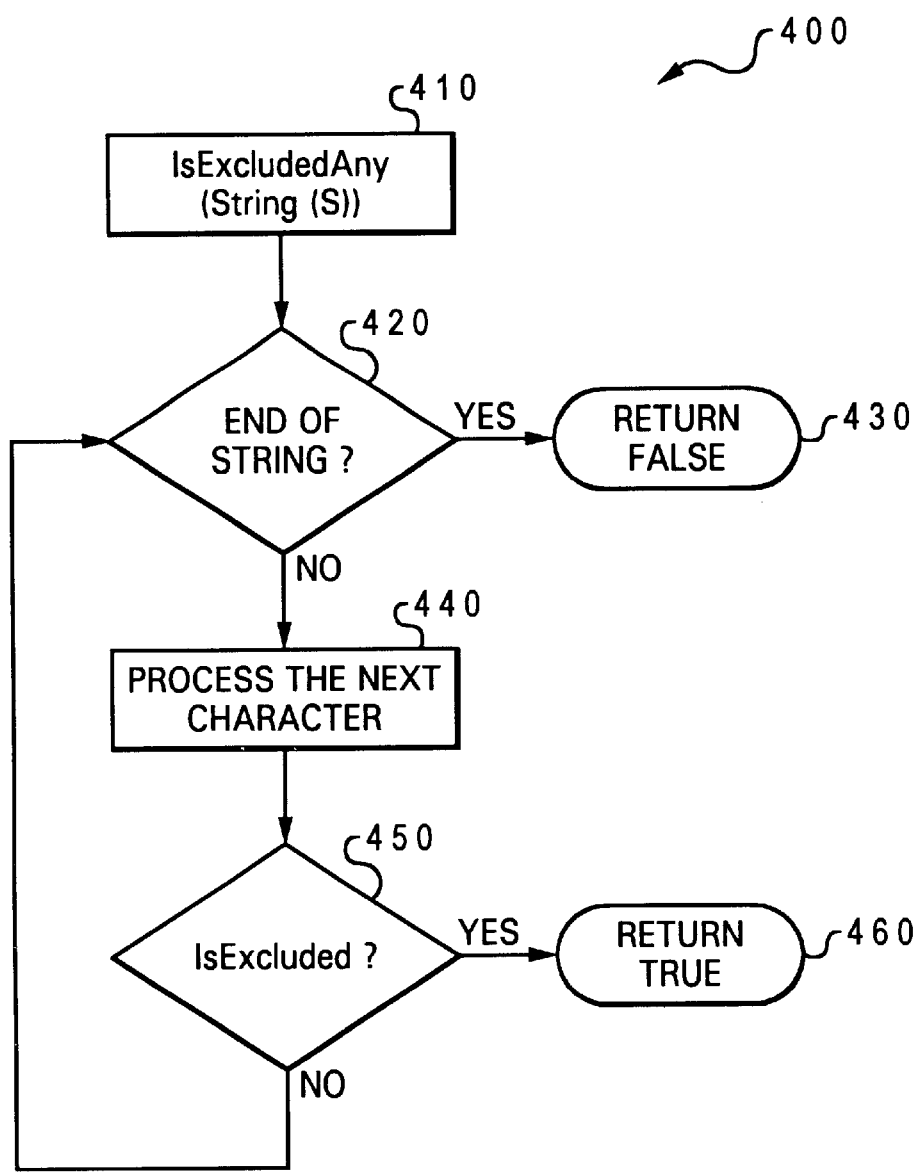
FIG. 4 illustrates a high-level flow chart of a first embodiment of the first processing routine illustrated in FIG. 3 according to the principles of the present invention.

Referring now to FIG. 4, there is illustrated a high-level flow chart 400 of a first embodiment of the first processing routine 320 illustrated in FIG. 3 according to the principles of the present invention. In the illustrated first embodiment, first processing routine 320 is described in the context of a software function call entitled IsExcludedAny. The function call IsExcludedAny is initiated, as illustrated at a start step 410, with the receipt of data string s, in its entirety. Next, as depicted at a decisional step 420, it is determined whether the process is at the end of data string s. If the determination at decisional step 420 is that it is at the end of data string s, control passes to a return false step 430. Next, as depicted at return false step 430, a false indication is returned to first processing routine 320.

However, if it is determined at decisional step 420 that it not at the end of data string s, control passes to a process the next character step 440. As illustrated at step 440, the next untested character in the data string s is passed onto a decisional step 450 to determine if the untested character is an excluded character for the specified font. This determination is accomplished by examining the bitwise representation of the character to see if it falls within the exclusion ranges defined for the specified font.

If it is established that the character is an excluded character, a true indication is returned to first processing routine 320, as depicted at return true step 460. If it is determined, however, that the character is not an excluded character, control passes back to decisional step 420 repeating the evaluation process until a character signifying the end of the data string is encountered. An exemplary IsExcludedAny algorithm is set forth in Table 1.

TABLE 1

```
boolean IsExcludedAny (char [ ] string)
{
    for (i=0; 1<string.length;i++)
    {
        corelogic of isExcluded on string [i]
    }
}
```

It should be noted that the isExcluded function is a conventional algorithm well known in the art and thus will not be described herein in detail.

Figure 5:
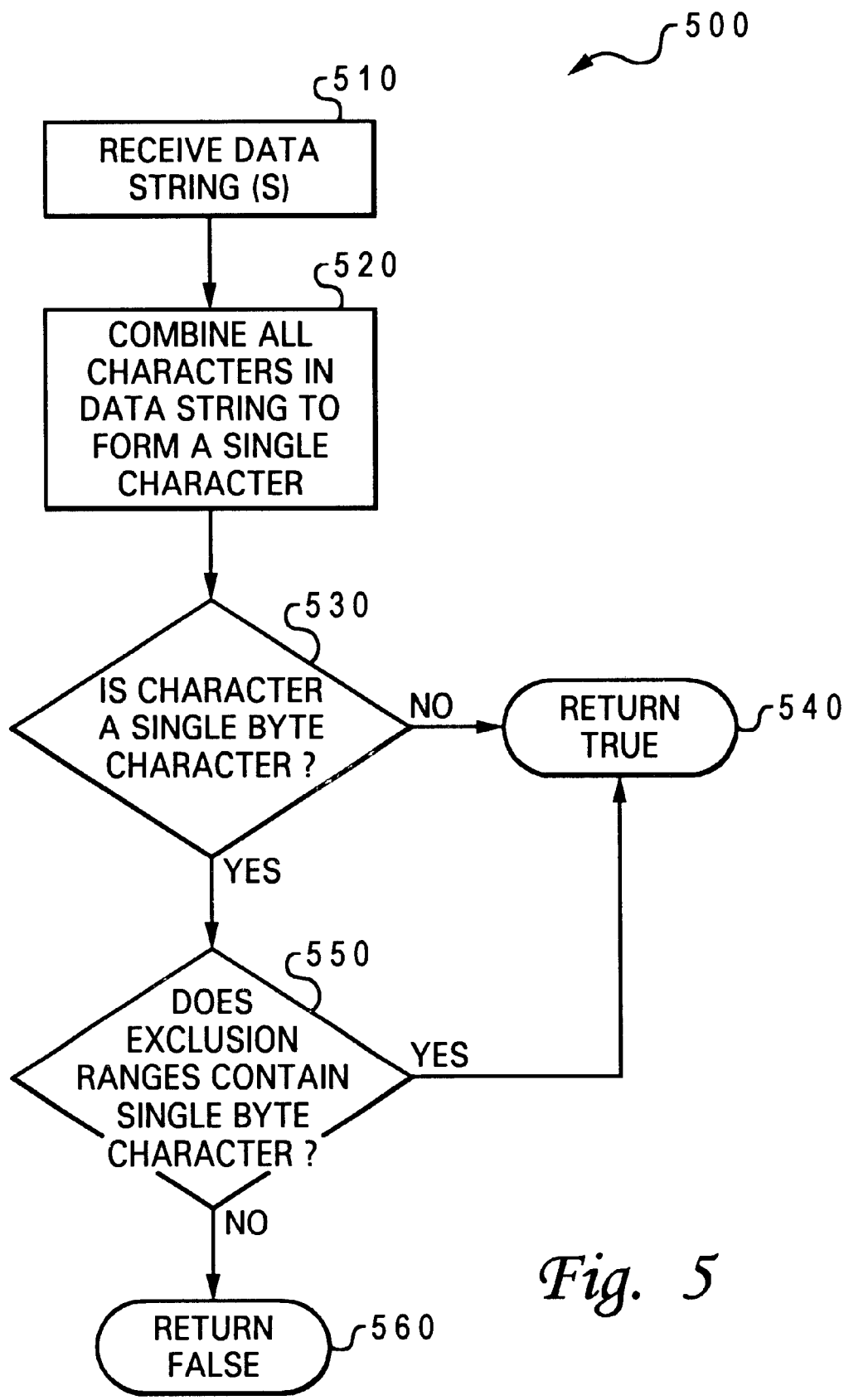
FIG. 5 illustrates a high-level flow chart of a second embodiment of the first processing routine illustrated in FIG. 3 according to the principles of the present invention.

With reference now to FIG. 5, there is illustrated a high-level flow chart 500 of a second embodiment of the first processing routine 320 illustrated in FIG. 3 according to the principles of the present invention. First processing routine 320 is initiated, as depicted at a receive data string s step 510, with the receipt of data string s, in its entirety. Next, as depicted in step 520, all the characters in data string s are combined to form a resultant single character. This is accomplished by bitwise ORing all the characters together using boolean operation OR.

Following the formation of the single resultant character, as illustrated in a decisional step 530, the resultant character is evaluated to determine if it is a single byte character. If it is determined that the resultant character is not a single byte character, control passes to a return true step 540. Next, as illustrated in step 540, a true indication is returned to first processing routine 320.

However, if it is determined at decisional step 530 that the resultant character is a single byte character, control passes to another decisional step 550. As depicted in decisional step 550, exclusion ranges defined for a specific host font are checked to determine if they include any single byte characters. If it is established that the exclusion ranges do include single byte character(s), a true indication is returned to first processing routine 320, as illustrated in step 540.

On the other hand, if it is determined that single byte characters are not excluded characters, i.e., exclusion ranges do not include single byte characters, control passes to a return false step 560. Next, as depicted in step 560, a false indication is returned to first processing routine 320.

Referring back to FIG. 3, as discussed above, the resultant product of first processing routine 320 is either a true or false indication. In the event that the result was a true indication, i.e., data string s contains an excluded character, data string s is passed to a conventional process 330. Briefly, as illustrated, conventional process 330 uses conventional routines to parse data string s into substrings, each of which is handled by a compatible host font.

In the event of a false indication, data string s is again transferred, in its entirety, to a second processing routine 340. In an advantageous embodiment, data string s is transmitted to second processing routine 340 as an array, e.g., a matrix of characters. Next, as depicted, second processing routine 340 assesses a limited number of characters in data string s to determine if every character can be converted under an underlying encoding scheme. A process flow of an exemplary embodiment of the second processing routine 340 is described hereinafter with respect to FIG. 6, with continuing reference to FIG. 3.

Figure 6:
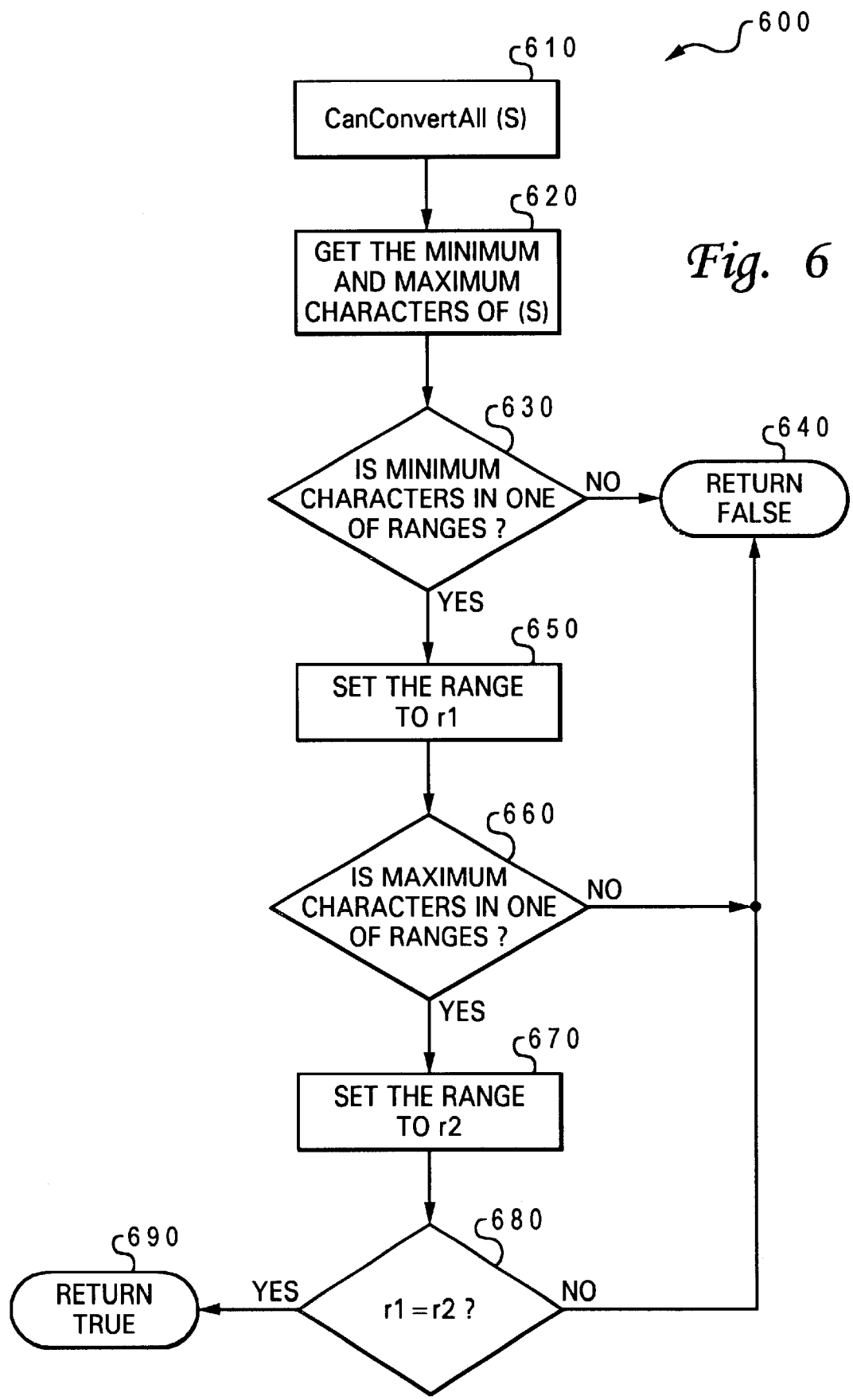
FIG. 6 illustrates a high-level flow chart of an embodiment of the second processing routine illustrated in FIG. 3.

Referring now to FIG. 6, there is illustrated a high-level flow chart 600 of an embodiment of second processing routine 340 illustrated in FIG. 3. In the illustrated embodiment, second processing routine 340 is discussed in terms of a function call, entitled CanConvertAll. The process is initiated when CanConvertAll receives data string s from first processing routine 320, as illustrated at begin step 610.

Following the receipt of data string s, characters with minimum and maximum values within data string s are identified, as depicted in step 620. The minimum character identified is then evaluated, as illustrated in a decisional step 630, to determine if the value, i.e., bitwise representation, of the character is within ranges specified by the underlying encoding scheme. If the character is not within one of the specified ranges, control is passed, as depicted to a return false step 640, at which time a false indication is returned to second processing routine 340. If, however, the minimum character is within one of the specified ranges supported, i.e., can be converted, by the underlying encoding scheme, the range is assigned a first identifier r1, as illustrated in step 650.

Following the assignment of first identifier r1, the maximum character identified is evaluated, as illustrated in a decisional step 660, to determine whether its value is within the ranges supported by the underlying encoding scheme. If the maximum value of the character is not within one of the specified ranges, control is passed to return false step 640, which then proceeds to return a false indication to second processing routine 340. However, if the maximum character is within one of the specified ranges supported by the underlying encoding scheme, the range is assigned a second identifier r2, as illustrated in step 670.

Following the assignment of the second identifier r2, first and second identifiers r1 and r2, respectively, are compared with each other, as depicted in a decisional step 680. Here, the specific ranges associated with the first and second identifiers r1 and r2 are compared with each other to determine if they are the same. If the result of the comparison is that first and second identifiers r1, r2 are not equal, i.e., the minimum and maximum characters are not in one specific range, control is passed, as illustrated to return false step 640, which then proceeds to return a false indication to second processing routine 340. On the other hand, if both first and second identifiers r1, r2 are equal, control is passed, as depicted to a return true step 690 that, in turn, returns a true indication to second processing routine 340.

It should be noted that the implementation of CanConvertAll depends significantly on the converter function. In the above illustration, if there are many ranges of characters that can be converted for a particular converter, the whole character string may be passed to CanConvertAll that, in turn, only examines the minimum and maximum characters. If both characters fall within one range, it can be concluded that the other characters can also be converted. In this case, the other characters in the data string need not be checked explicitly.

Referring back to FIG. 3, in the event that second processing routine 340 receives a false indication, data string s is passed to the conventional process 330 for further processing (see above). If, on the other hand, a true indication is received by second processing routine 340, i.e., all the characters in the data string s can be mapped into the underlying encoding scheme, data string s is passed down along with the specified font to underlying graphic routines 350 for display.

In summary, if the results from the function calls IsExcludedAny and CanConvertAll is false and true, respectively, it can be concluded that none of the characters in the data string are excluded and all of the characters can be mapped into the underlying encoding scheme. The entire data string can be passed down to "lower level" drawing routines immediately, without having to utilize the conventional functions, i.e., isExcluded and CanConvert, repeatedly for the individual characters.

It should noted that although the present invention has been described in the context of a computer system, those skilled in the art will readily appreciate that the present invention is also capable of being distributed as a computer program product in a variety of forms; the present invention applies regardless of the particular type of signal-bearing media, i.e., computer usable medium, utilized to actually carry out the distribution. Examples of signal-bearing media includes recordable type media, such as floppy disks and hard disk drives, and transmission type media such as digital and analog communication links.

In a preferred embodiment, the present invention is implemented in a computer system programmed to execute the method described herein. Accordingly, in an advantageous embodiment, sets of instructions for executing the method disclosed herein are resident in RAM of one or more of computer systems configured generally as illustrated in FIG. 1. Until required by the computer system, the set of instructions may be stored as computer program product in another computer memory, e.g., a disk drive. In another advantageous embodiment, the computer program product may also be stored at another computer and transmitted to a user's workstation by an internal or external communication network, e.g., LAN or WAN, respectively.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for optimizing processing of single byte characters within a multibyte character encoding scheme, in association with an underlying data encoding scheme employed within an operating system, said method comprising the steps of:
   receiving a data string;
   passing said data string in its entirety to a first processing routine; and
   evaluating said data string within said first processing routine to determine if any character in said data string is an excluded character of a host font.

2. The method as recited in claim 1 further comprising:
   transferring said data string in its entirety to a second processing routine; and
   assessing a limited number of characters in said data string to determine if said data string can be converted under said underlying encoding scheme.

3. The method as recited in claim 2 wherein said step of transferring further comprises transmitting said data string to said second processing routine as an array.

4. The method as recited in claim 1 wherein said step of receiving a data string further comprises inputting said data string from a data entry device.

5. The method as recited in claim 1 wherein said step of passing further comprises transmitting said data string to said first processing routine as an array.

6. The method as recited in claim 1 wherein said step of evaluating further comprises the steps of:
   combining all characters in said data string using boolean operation OR to form a single character;
   determining if said single character is a single byte character; and
   checking exclusion ranges of said host font to determine if said exclusion ranges contain a single byte character.

7. A computer-readable medium having stored thereon computer executable instructions for implementing a method for optimizing processing of single byte characters within a multibyte character encoding scheme, in association with an underlying data encoding scheme employed within an operating system, said computer executable instructions when executed, perform the steps of:
   receiving a data string;
   passing said data string in its entirety to a first processing routine;
   evaluating said data string to determine if any character in said data string is an excluded character of a host font;
   transferring said data string in its entirety to a second processing routine; and
   assessing a limited number of characters in said data string to determine if said data string can be converted under said underlying encoding scheme.

8. The computer-readable medium as recited in claim 7 wherein said step of receiving a data string further comprises inputting said data string from a data entry device.

9. The computer-readable medium as recited in claim 7 wherein said step of passing further comprises transmitting said data string to said first processing routine as an array.

10. The computer-readable medium as recited in claim 7 wherein said step of transferring further comprises transmitting said data string to said second processing routine as an array.

11. The computer-readable medium as recited in claim 7 wherein said step of evaluating further comprises the steps of:
    combining all characters in said data string using boolean operation OR to form a single character;
    determining if said single character is a single byte character; and
    checking exclusion ranges of said host font to determine if said exclusion ranges contain a single byte character.

12. A computer program product comprising:
    a computer usable medium; and
    computer readable program code means embodied in said medium for optimizing processing of single byte characters within a multibyte character encoding scheme, in association with an underlying data encoding scheme employed within an operating system, said computer readable program code means including:
    means for receiving a data string;
    means for passing said data string in its entirety to a first processing routine; and means for evaluating said data string to determine if any character in said data string is an excluded character of a host font, wherein said means for evaluating comprises:
    means for combining all characters in said data string using boolean operation OR to form a single character;
    means for determining if said single character is a single byte character; and means for checking exclusion ranges of said host font to determine if said exclusion ranges contain a single byte character.

13. The computer program product as recited in claim 12, said computer readable program code means further comprising:
    means for transferring said data string in its entirety to a second processing routine; and
    means for assessing a limited number of characters in said data string to determine if said data string can be converted under said underlying encoding scheme.

14. The computer program product as recited in claim 13 wherein said means for transferring further comprises means for transmitting said data string to said second processing routine as an array.

15. The computer program product as recited in claim 12 wherein said means for receiving a data string further comprises means for inputting said data string from a data entry device.

16. The computer program product as recited in claim 12 wherein said means for passing further comprises means for transmitting said data string to said first processing routine as an array.

17. A system for optimizing processing of single byte characters within a multibyte character encoding scheme, in association with an underlying data encoding scheme employed within an operating system, said system comprising:

means for receiving a data string;

means for passing said data string in its entirety to a first processing routine; means for evaluating said data string to determine if any character in said data string is an excluded character of a host font;

means for transferring said data string in its entirety to a second processing routine; and means for assessing a limited number of characters in said data string to determine if said data string can be converted under said underlying encoding scheme.

18. The system as recited in claim 17 wherein said means for passing further comprises means for transmitting said data string to said first processing routine as an array.

19. The system as recited in claim 17 wherein means for evaluating further comprises:

means for combining all characters in said data string using boolean operation OR to form a single character;

means for determining if said single character is a single byte character; and means for checking exclusion ranges of said host font to determine if said exclusion ranges contain a single byte character.

* * * * *